United States Patent [19]
Borst et al.

[11] Patent Number: 5,970,049
[45] Date of Patent: Oct. 19, 1999

[54] APPARATUS AND METHOD FOR TEMPLATE-BASED SCHEDULING PROCESSES USING REGULARITY MEASURES

[75] Inventors: Simon C. Borst, North Plainfield; Kajamalai Gopalaswamy Ramakrishnan, Berkeley Heights, both of N.J.

[73] Assignee: Lucent Technologies Inc., Murray Hill, N.J.

[21] Appl. No.: 08/825,240

[22] Filed: Mar. 27, 1997

[51] Int. Cl.⁶ .................................................. H04L 12/56
[52] U.S. Cl. ........................... 370/235; 370/412; 370/468
[58] Field of Search .................................... 370/230, 229, 370/412, 465, 468, 395, 397, 235, 458, 399

[56] References Cited

U.S. PATENT DOCUMENTS

| | | | |
|---|---|---|---|
| 5,241,465 | 8/1993 | Oba et al. | 364/401 |
| 5,515,363 | 5/1996 | Ben-Nun et al. | 370/412 |
| 5,684,791 | 11/1997 | Raychaudhuri et al. | 370/395 |
| 5,696,764 | 12/1997 | Soumiya et al. | 370/395 |
| 5,889,779 | 3/1999 | Lincoln | 370/395 |

FOREIGN PATENT DOCUMENTS 0702473  3/1996  European Pat. Off. .

OTHER PUBLICATIONS

Y. Arian, et al., "Algorithms for generalized round robin routing", *Operations Research Letters*, vol. 12, No. 5, pp. 313–319 (Nov. 1992).

A. Itai, et al., "A Golden Ratio Control Policy for a Multiple–Access Channel", *IEEE Trans. on Automatic Control*, vol. AC–29, No. 8, pp. 712–718 *Aug. 1984).

M.G.C. Resende, et al., "Computign Lower Bounds For The Quadratic Assignment Problem With An Interior Point Algorithm For Linear Programming", *Operations Research*, vol. 43, No. 5, pp. 781–791 (1995).

S.C. Borst, et al., "Optimization of fixed time polling schemes", *Telecommunication Systems*, No. 3, pp. 31–59, (1994).

M. Hofri, et al., "Packet Delay under the Golden Ratio Weighted TDM Policy in a Multiple–Access Channel", *IEEE Transactions on Information Theory*, vol. IT–33, No. 3, pp. 341–349 (May 1987).

B. Hajek, "Extremal Splittings Of Point Processes", *Mathematics Of Operations Research*, vol. 10, No. 4, pp. 543–556 (Nov. 1985).

Gupta S et al: "Traffic Classification for the Round–Robin Scheduling Schemes in ATM Networks", Networking: Foundation for the Future, San Francisco, Mar. 28–Apr. 1, 1993, vol. 2, No. CONF. 12, Mar. 18, 1993, Institute of Electrical and Electronics Engineers.

Chung–Sheng Li et al: "Pseudo–Isochronous Cell Switching in ATM Networks", Proceedings of the Conference on Computer Communications (INFOCOM), Totonto, Jun. 12–16, 1994, vol. vol. 2, Jun. 12, 1994. Institute of Electrical and Electronics Engineers.

*Primary Examiner*—Chau Nguyen

[57] ABSTRACT

An advantageous measurement technique for evaluating the overall scheduling regularity producible by a scheduling template having particular slot assignment orderings for respective classes of events such as, for example, transmitting order of communication signals over respective virtual circuits by a node of a network. This measurement technique is used for measuring the overall scheduling regularity producible by each of a plurality of different scheduling templates to select the template having a desirable regularity measure for use in establishing a scheduling order of events for a network.

26 Claims, 4 Drawing Sheets

APPARATUS AND METHOD FOR TEMPLATE-BASED SCHEDULING PROCESSES USING REGULARITY MEASURES

FIELD OF THE INVENTION

The invention relates to event scheduling including, for example, an order of transmitting signals over a communication network.

BACKGROUND OF THE INVENTION

Networks are a principal means of exchanging or transferring information, such as information signals representing voice, audio, data or video, among communication devices. Such communication devices often include devices for sending and/or receiving information, such as computer terminals, multimedia workstations, facsimile machines, printers, servers and telephones. Information transmitted on the network can be of many different forms but is often formatted into fixed-length data packets or cells. Networks, such as broadband ISDN (BISDN) employing asynchronous transfer mode (ATM) packet switching, are increasingly being used for the reliable, high-speed transmission of information. This increased use has brought major changes in network architecture and infrastructure design, as well as in network operations, to increase communication capacity and quality.

A typical network includes switch nodes having ports coupled by links to ports of other nodes and to the communication devices. Each link is uni- or bi-directional and is characterized by a bandwidth or link capacity in the directions of information transfer. Information to be exchanged is often conveyed over a path containing a set of nodes and links connecting two devices. Such a path can be regarded as a "virtual circuit" (VC) whereby one communication device specifies the intended destination device for the information, and the network delivers the information as though a dedicated circuit connected the two communication devices. Often multiple VCs are simultaneously maintained through a single switch node. In a similar manner, different VCs are often simultaneously maintained over a common link between switch nodes.

Buffer memories are typically employed in the switch nodes to increase the number of VC's that can simultaneously be carried by the node by buffering transmission of data packets of a type that is relatively delay insensitive while buffering to a lesser extent transmission of those packets of a type that is relatively delay sensitive. Such buffer memories effectively operate as respective queues for the packets that are to be conveyed through the respective ports to a common link or multiple links. By selecting an advantageous order in which packets from these queues are routed through a common switch node or multiplexed over a common link, it is possible to increase the number of VCs that the switch node can simultaneously maintain as well as increase communication quality.

In particular networks, a template is used to provide the transmission scheduling order for data packets of the respective VCs. A conventional template includes a fixed number of slots, wherein each slot position represents a scheduling position of corresponding packets for a particular VC. The order of such slots in the template determines the order or sequence in which the switch node repetitively transmits packets for the corresponding VCs. Desirable scheduling orders that facilitate increased VC capacity and improved quality of service transmit packets for VCs of relatively delay sensitive information in a manner that is substantially regular such as, for example, at least roughly periodic and non-bursty.

Known methods for determining scheduling orders or template slot positions include round robin and golden ratio techniques which are described in Y. Arian and Y. Levy, "Algorithms for Generalized Round Robin Routing", *Operations Research Letters*, vol. 12, no. 5, pp. 313–319 (November 1992), and A. Itai and Z. Rosberg, "A Golden Ratio Control Policy for a Multiple-Access Channel", *IEEE Trans. on Automatic Control*, vol. AC-29, no. 8, pp. 712–718 (August 1984), respectively, and which are both incorporated by reference herein. However, such scheduling methods provide marginally enhanced ordering of the template slots and, at times, overlook more advantageous slot orderings.

Accordingly, a need exists for a technique for determining improved scheduling templates orderings.

SUMMARY OF THE INVENTION

The invention is based on an advantageous measurement technique for evaluating the overall scheduling regularity producible by a scheduling template having particular slot assignments to respective classes of communication signals such as, for example, data packets of respective virtual circuits. According to the invention, this measurement technique is used for measuring the overall scheduling regularity producible by each of a plurality of different scheduling templates to select the template having a desirable regularity measure for use in establishing a scheduling order for a communication network. In particular, the measurement technique measures scheduling regularity based on at least one summation of a convex function of positional distances between slot positions assigned to a corresponding class with lower summation values representing scheduling templates with better regularity characteristics. It is further possible to scale the respective summations produced for respective classes based on the relative priority of the corresponding classes.

Such methods for determining scheduling template slot ordering are advantageously useable in a variety of communication networks including wired networks, such as BISDN networks, as well as wireless networks such as time division multiple access-based networks.

Additional features and advantages of the present invention will become more readily apparent from the following detailed description and accompanying drawings.

DETAILED DESCRIPTION

The invention concerns techniques for determining a scheduling template for use in providing an advantageous scheduling of an order of events such as transmitting communication signals of different signal classes in a communication network. Such advantageous scheduling facilitates enhanced communication capacity on the network and communication quality. A scheduling template has a plurality of slots assigned to corresponding signal classes such as for data packet scheduling for a plurality of virtual circuits admitted through a network node. An ordering of the slots indicates a scheduling order for transmission of the communication signals of the respective classes. In order to facilitate the enhanced communication capacity and/or communication quality, the invention determines a template that provides transmission order or sequence of signals for the classes that is substantially regular or at least roughly periodic and non-bursty.

Although the signal classes of the previously described templates represent communication signals of respective virtual circuits, it is also possible for a signal class to represent more than one virtual circuit for transmitting information of the same or similar type as is described in greater detail below with regard to FIG. 5.

The invention is useable in communication networks that could benefit from enhanced communication signal transmission scheduling including wired networks such as broadband ISDN (BISDN) networks and wireless networks such as, for example, time division multiple access (TDMA) based networks. However, exemplary embodiments of the invention are described below with respect to a BISDN network for illustration purposes only and is not meant to be a limitation of the invention. With regard to a TDMA-based wireless network, the invention is useable to determine the scheduling order of respective communication signals communication between a base station and associated wireless terminals.

Also, scheduling templates determined in accordance with the invention are useable for providing the order of assigning calls routed between two areas over a respective plurality of network routes between such points. For instance, if twenty different telecommunication routes are useable for routing calls between Chicago and New York, then the order in which calls are directed over the respective routes by a telecommunication provider can be based on such scheduling templates. Moreover, a scheduling template according to the invention is useable for indicating the order of events in which individual data processors, such as microprocessors or computers, of a plurality of processors perform respective operations, such as transactions. In this manner, relatively large numbers of operations or transactions can be performed by a respective number of processors. Scheduling templates for transactions processing are advantageously useable by financial institutions. In a similar manner, scheduling templates are likewise useable in computers having a plurality of processors for scheduling operations to be performed by respective processors for parallel processing with enhanced processing capacity.

Figure 1:
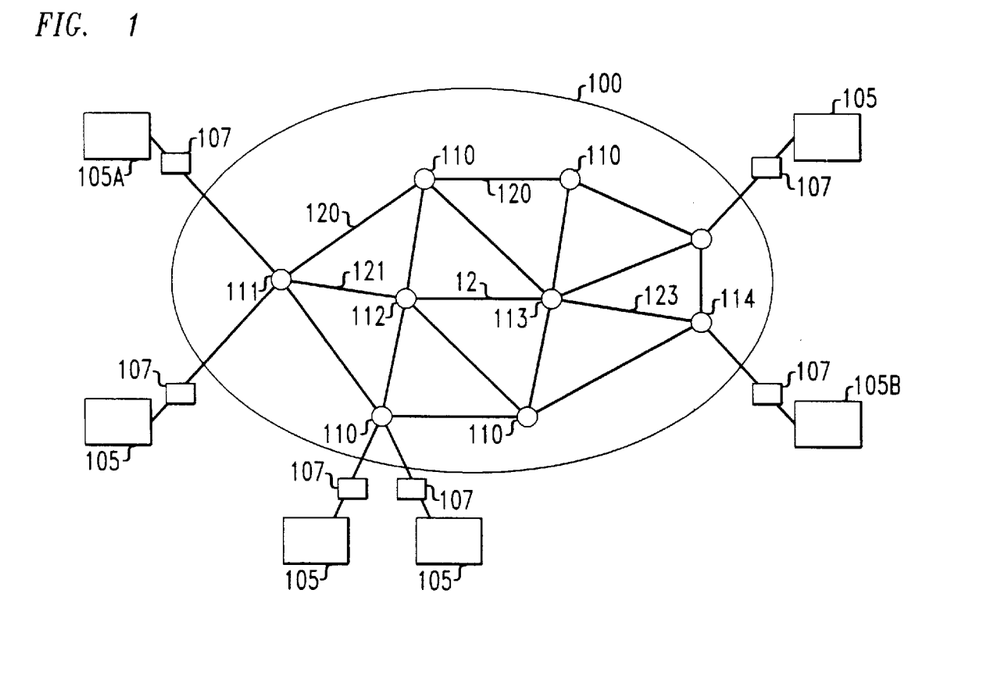
FIG. 1 illustrates a schematic block diagram of an exemplary network employing nodes operating in accordance with the invention.

An exemplary communication network 100 includes communication links 120 coupled to communication switch nodes 110. In a typical BISDN network, it is possible for the number of links connected to a node 110 to be on the order of 512 or greater. Each link 120 possesses a respective capacity of data packets that can be conveyed over the link per unit of time which is typically referred to as the link's bandwidth. Exemplary links having bandwidths of approximately 622 MB/sec. have been used in conventional BISDN networks. Each multi-port node 10 typically includes a buffer memory useable for buffering signals routed to respective links 120.

Exemplary packets include ATM cells having a fixed length of 53 bytes. It is possible for such data packets to represent various types of information including, for example, voice, video, audio or data such as text. Also, packets in a higher protocol layer may have a longer length and are typically referred to as messages which can be subdivided to generate a plurality of cells for ATM switching.

It is possible for one or more of the nodes 110 to be located within a particular network switch, such as, for example, ATM data switches manufactured by Lucent Technologies Inc. of Murray Hill, N.J., including Lucent's GlobeView 2000 switches. Particular nodes 110 are further coupled to access regulators 107 which are coupled to communication devices 105. The communication devices 105 are typically operated by service providers and users. The access regulators 107 regulate the flow or rate of data packets from the communication devices 105 into the network 100 based on a set of access regulator parameters. It is possible for the access regulators 107 to be leaky bucket regulators, buffered leaky bucket regulators or cascaded leaky bucket regulators. Access regulators are typically used in conventional BISDN networks, however, it is not critical to practicing the present invention. It is possible for the communication devices 105 to be directly coupled to the nodes 110 in FIG. 1 according to the invention.

Communication devices 105 communicate with respective other communication devices 105 by a VC established over particular nodes 110 and links 120 in the network 100. More specifically, it is possible for information to be transferred between initiating and destination communication devices 105, by the initiating device 105 requesting a VC path for carrying the call to be established between the particular devices 105. For instance, one possible path to carry or route a call from a communication device 105A to a destination communication device 105B includes nodes 111, 112, 113 and 114 and links 121, 122 and 123.

The particular path chosen to route a VC through the network 100 requires that the included nodes 110 and links 120 have sufficient available buffer memory and link bandwidth to route such a VC. Before the requested VC can be routed, the node buffer space and link bandwidth must be determined to chose a path with sufficient resources to meet such requirements. As in conventional nodes, it is possible for more than one VC to be established through a single output port of the node 110. The particular technique for establishing a VC is not critical to practicing the invention and it is possible to employ any of various techniques including, for example, such techniques disclosed in U.S. Pat. Nos. 5,519,836 and 5,502,816, which are assigned to the assignee of the present invention and incorporated by reference herein.

Figure 2:
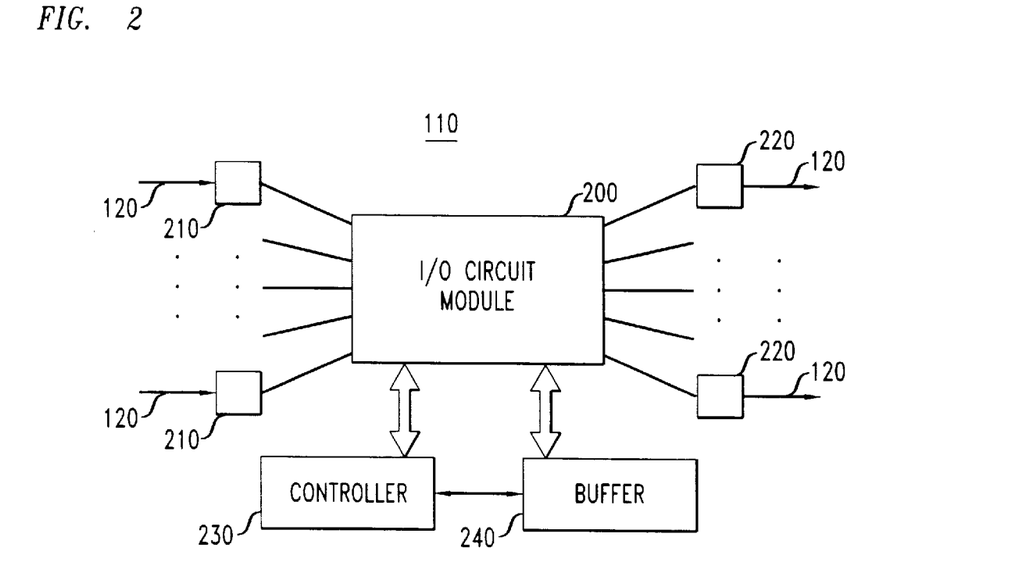
FIG. 2 illustrates a schematic block diagram of an exemplary node employed in the network of FIG. 1.

An exemplary multi-port node 110 useable with the invention is shown in FIG. 2. Exemplary components for the depicted node components in FIG. 2 can be those employed in the previously listed commercially available ATM data switches. The node 110 of FIG. 2 includes a plurality of input ports 210 and output ports 220 connected to respective network links 120 in FIG. 1. It is possible for the number of ports 210 and 220 to be on the order of hundreds. The ports 210 and 220 are further coupled to a input-output (I/O) circuit module 200 that is controlled by a controller 230.

The controller 230 provides connection admission control (CAC) that responds to requests for establishing paths from particular input ports 210 to particular output ports 220 for providing a particular segment of a VC for conveying packets over the network 100. Each port 210 and 220 in the multi-port node 100 typically can route calls of at least one specific priority level. The controller 230 and I/O module 200 are further coupled to a buffer memory 240 that enables the node 110 to temporarily store received data for particular calls routed through an output port 220. It is possible to use random access memory (RAM) for the buffer 240.

The node arrangement in FIG. 2 enables different packets received at one or more input ports 210 to be routed and multiplexed through output ports 220 onto a single network link 120. In a similar manner, this arrangement enables different packets received at a single input port 210 to be routed and demultiplexed through two or more output ports 220 onto respective network links 120. The multiplexing and demultiplexing of the packets transmitted and/or received over the links 120 can be performed, for example, by the module 200 as controlled by the controller 230.

Figure 3:
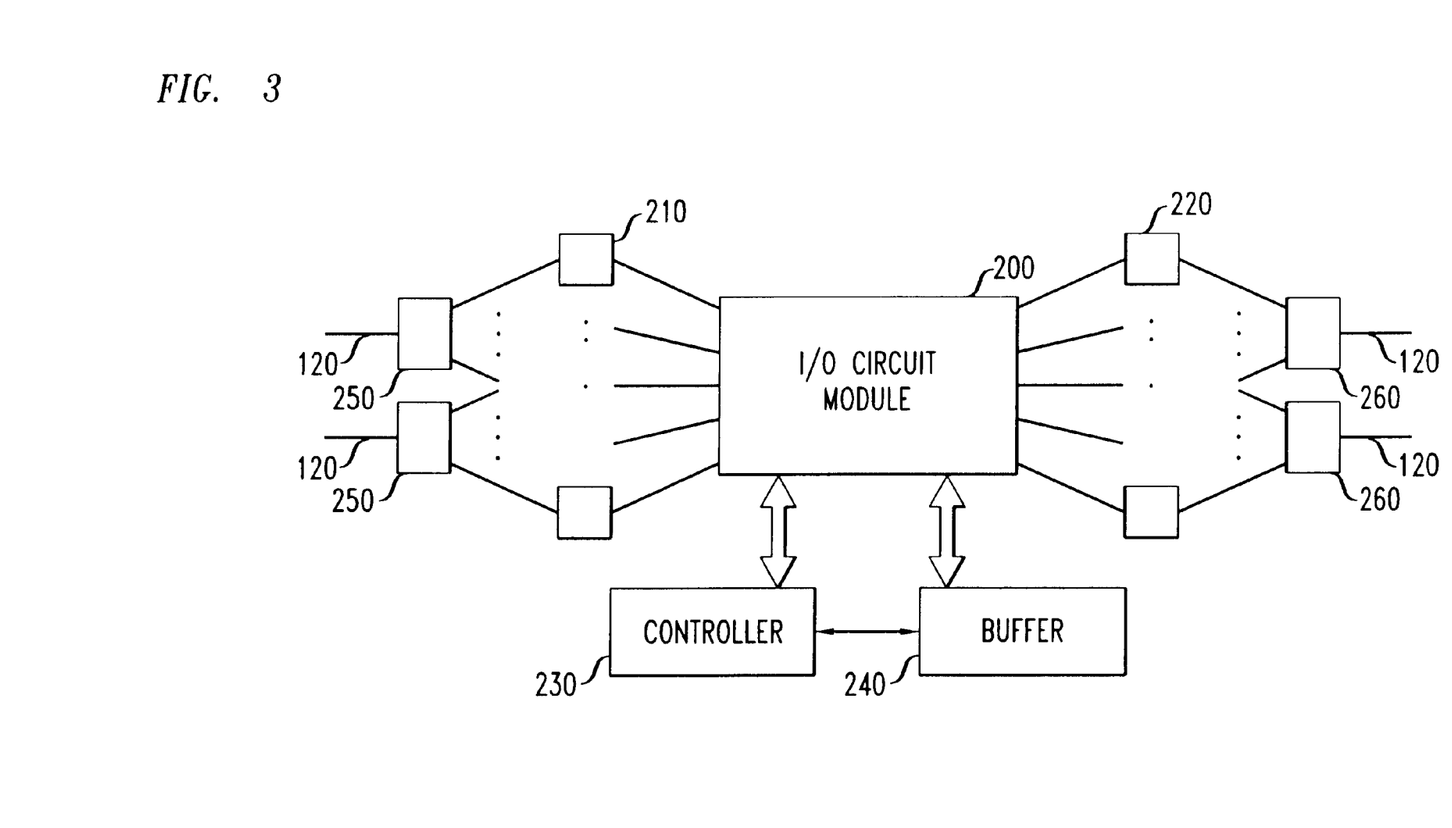
FIG. 3 illustrates a schematic block diagram of an alternative embodiment of the node of FIG. 2.

Although the communication links 120 are directly coupled to either input or output ports, it is possible for the links 120 to alternatively provide such coupling by employing switch networks between the links 120 and the ports 210 and 220. However, the particular arrangement used for coupling the ports 210 and 220 and the network links 120 is not critical to practicing the invention. For instance, nodes having ports that can transmit and receive information can alternatively be used with the invention. Also, demultiplexers 250 and/or multiplexers 260 connected between the respective input and output ports 210 and 220 and the links 120 and controlled by the controller 230 can be used instead of the module 200 to perform the desired multiplexing and demultiplexing as shown in FIG. 3. Similar components in FIGS. 2 and 3 are like numbered for clarity, for example, the controller 230 and the ports 210 and 220.

In typical ATM packet switching networks, such as BISDN networks, it is possible to establish VC's for transmitting data packets of several different information types. Such information types often have different respective sensitivities to delay or regularity of receipt of corresponding data packets by a destination device. An information sensitivity to regularity of receipt concerns the approximate extent to which receipt of corresponding data packets can deviate from being periodic. For instance, in conventional ATM systems, it is possible to establish VC's for transmitting data packets representing respective information types of constant bit rate (CBR) data packets such as for voice or audio data, real-time variable bit rate (RT-VBR) packets for video data such as video conferencing, non-real-time variable bit rate (NRT-VBR) packets such as for still picture data, available bit rate (ABR) packets such as for relatively delay insensitive text and unspecified bit rate (UBR) packets.

In FIGS. 2 and 3, the buffer 240 enables the node 110 to take advantage of respective permissible delays and regularity of different information types in conveying data packets to their destinations by temporarily storing packets in a queue-like fashion received from an input port 210 and ultimately routed through an output port 220 while conveying other packets. Such selective buffering enables a relatively high packet conveyance capacity for the node 110. The controller 230 also provides buffer management for the buffer 240. The controller 230 uses a scheduling template for determining the order in which data packets from the queues are to be transmitted over one or more of the multiple links 120 in accordance with respective established VCs.

Figure 4A:
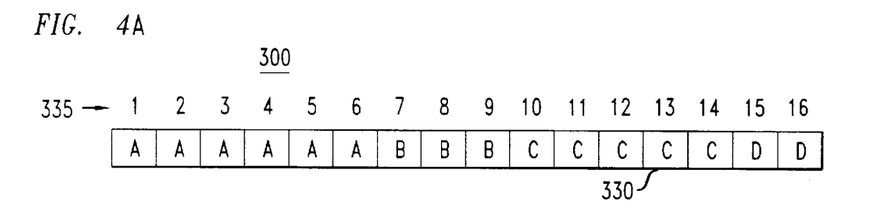
FIGS. 4A, 4B and 4C illustrate exemplary scheduling templates useable in the network of FIG. 1 and nodes of FIGS. 2 and 3.
Figure 4B:
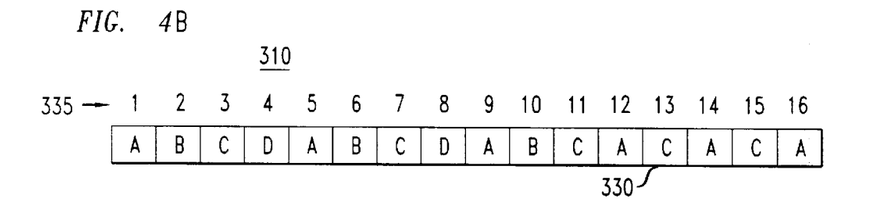
Figure 4C:
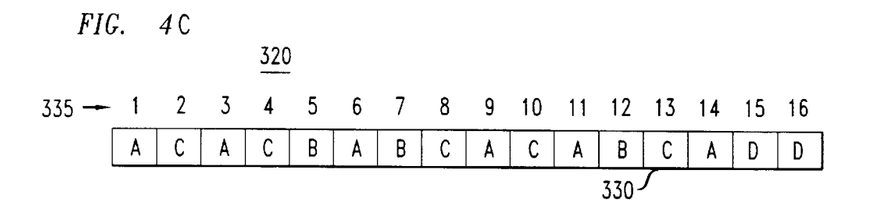

Representations of three different exemplary scheduling templates 300, 310 and 320 useable by the node 110 of FIGS. 2 or 3 are shown in FIGS. 4A, 4B and 4C. The templates 300, 310 and 320 denote the scheduling order for transmitting data packets for four different signal classes representing four different established VC's through the node 110 as indicated by the representations A, B, C and D. Each template 300, 310 and 320 has sixteen slots 330 for illustration purposes only and scheduling templates having a greater or less number of slots are also useable in accordance with the invention. Slot positions within each template 300, 310 and 320 are denoted by reference numbers 335.

In the illustrated example, the ratio of data packets to be transmitted over a unit of time for transmitting sixteen packets for the four different classes A, B, C and D is 6:3:5:2, respectively. It is possible to determine such ratios, for example, in accordance with the delay or jitter sensitivities of the respective classes and bandwidth requirements of the respective virtual circuits. The order in which the class representations appear in the slots 330 of the respective templates 300, 310 and 320 is the order in which the packets are transmitted by the corresponding node 110 of FIG. 2 or 3. Thus, the order in which packets are transmitted in accordance with the scheduling template 300 is six packets representing the class A in slots 1 through 6, then three packets representing the class B in slots 7 through 9, then five packets representing the class C in slots 10 through 14, and then two packets representing the class D in slots 15 and 16. The sequence of the template 300 is then repeated again for the next sixteen and subsequent packets.

However, such a template ordering is not very advantageous if any of the classes were relatively sensitive to delays or delay variations by the receiving device. The transmission of six packets for the class A and then a pause of an interval corresponding to a transmission of ten packets for other VC's or signal classes before transmission of another six packets of class A provides relatively long delays of ten packet transmissions before burst of six packet transmissions of the class A. Such delays between bursts of packets is generally undesirable for relatively delay sensitive or regularity sensitive information, such as CBR in conventional ATM networks. Thus, it is desirable to identify a scheduling template slot ordering that is advantageous with respect to the delay variation and regularity sensitivities of the classes to be transmitted.

For instance, if the classes A, B, C and D corresponded to the transmission of ATM information such as CBR, RT-VBR, NRT-VBR and UBR information types, respectively, then the order of priority as to delay or regularity sensitivity would be classes A, B, C and D. The classes A, B, C and D represent four different information types for illustration purposes only and are not meant to be a limitation of the invention. It is possible to determine advantageous scheduling templates orderings in accordance with the invention when one or more of the classes represents communication signals or data packets for more than one virtual circuit of the same or similar information type. Exemplary similar information types would include UBR and ABR which are representable by the same class in a template.

The scheduling template 310 of FIG. 4B represents an improved scheduling order for such classes relative to the template 300 of FIG. 4A. The ordering in slot positions 1 through 8 are A, B, C, D, A, B, C and D. Although data packets for each information class are advantageously equally spaced in the first eight slots 335, such is not the case for the latter eight slots 335. The scheduling template 320 of FIG. 4C possesses a further improved ordering relative to the template 310 of FIG. 4B, wherein class A having the highest sensitivity to delay is substantially equally spaced in the sixteen slots. Slot positions for the class B is are further separated to the extent possible in the slots 335 not assigned to class A. The classes C and D representing NRT-VBR and UBR/ABR has the lowest priority relative to delay sensitivity and are assigned to the remaining slots in any order. The methods in accordance with the invention enable determination of advantageous template scheduling orderings, such as the that of the template 320 of 4C relatively rapidly. An exemplary technique for determining scheduling template ordering according to the invention is shown in FIG. 5.

Figure 5:
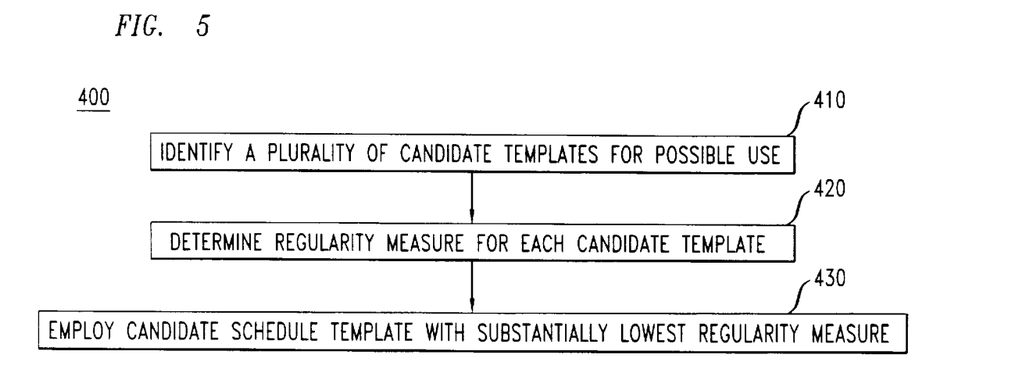
FIG. 5 illustrates a flow diagram of an exemplary method for determining scheduling templates in accordance with the invention.

FIG. 5 shows a technique 400 for determining an advantageous template from a plurality of candidate templates. In FIG. 5, a plurality of possible candidate templates are identified in step 410. It is possible to identify or select this plurality of candidate templates based on a selection criteria such as, for example, selecting candidate templates having a substantially random ordering or determined ordering based on signal class priority. However, the particular criteria used for determining the plurality of candidate templates is not critical to practicing the method 400 and other routines for providing the plurality of candidate templates are useable according to the invention.

Figure 6:
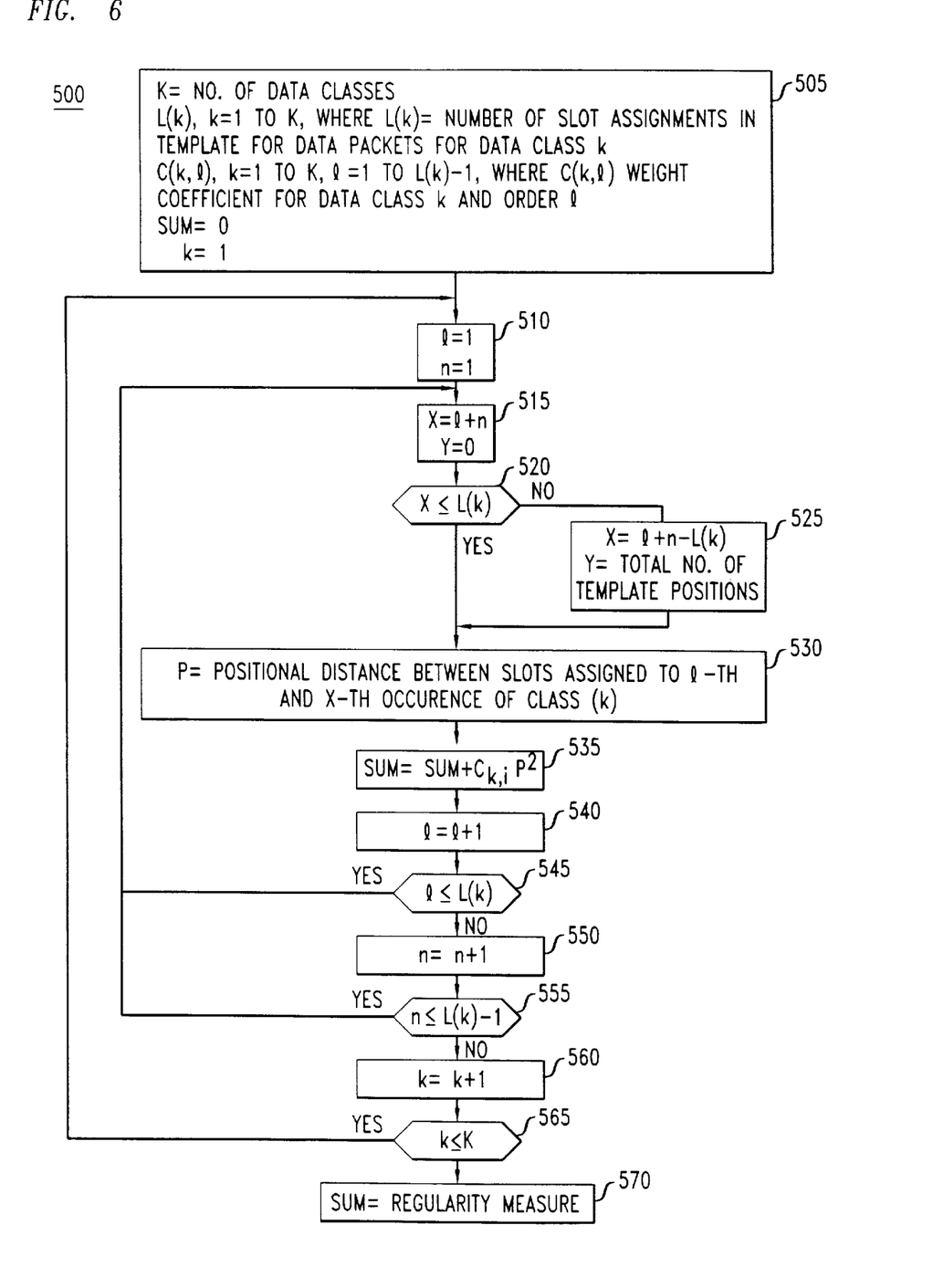
FIG. 6 illustrates a flow diagram of an exemplary method for determining a regularity measure in accordance with the invention for use in the method of FIG. 5.

A regularity measure is then determined according to step 420 for each of the identified plurality of candidate templates. The regularity measure is a measure of transmission regularity or extent of periodic transmissions of data packets for respective signal classes producible by the respective candidate template. An exemplary method 450 for determining such a regularity measure is shown in FIG. 6, described below. After the regularity measures are determined for the plurality of template candidates in step 420 of FIG. 5, the candidate template having the lowest regularity measure is determined in step 430 and used for transmitting data packets.

Although the method 400 selects the candidate template with the lowest regularity measure for use in determining the order in transmitting data packets, it is alternatively possible to use the candidate template having a substantially desirable regularity measure, such as a measure that is relatively close to the lowest measure. Moreover, it is possible to determine the regularity measure for less than the total of the plurality of candidate templates. For example, it is possible to determine the regularity measure of a sufficient number of candidate templates to identify a first one having a regularity measure that satisfies a desirable threshold value.

FIG. 6 illustrates an exemplary method 500 for determining a regularity measure of a candidate scheduling template according to the invention for use in step 420 of FIG. 5. The method 500 determines the regularity measure of a candidate scheduling template based on a total of summations of functions of positional distances between the slot positions assigned to respective signal classes. For example, in the candidate scheduling template 320 of FIG. 4C, the positional distances between the slots assigned to the class A is 2, 3, 3, 2, 3 and 3 in order from left to right. Included in such a summation is a "wrap-around" positional distance between the last occurrence of a slot assigned to class A, slot position 14, and the first occurrence of a slot assigned to class A, slot position 1, which is the positional distance of 3. This "wrap-around" positional distance is advantageous to include in the regularity measure because templates are employed in a cyclical manner for transmitting data packets such that after the first sixteen data packets are transmitted in accordance with the template 320, the seventeenth data packet transmission would be of a signal class corresponding to the scheduling slot position 1.

Moreover, such regularity measure total of summations can further include the positional distances between the n-th occurrences of slot positions in the sequence of slot positions assigned to the respective classes for at least one n greater than or equal to 2. Such n-th occurrence sums are alternatively referred to as higher order summations hereinafter. For example, a second order distance for the signal class A in FIG. 4C is 5, 6,5, 5, 6, 5, respectively. The last distance in these second order distances advantageously includes a "wrap-around" positional distance of 5. Weighting coefficients are useable for the respective summations of the particular signal classes to increase or decrease the significance or weight given to slot positions of respective signal classes and/or the significance of the higher order summations. The resulting total of summations is indicative of the extent of transmission regularity achievable with the candidate scheduling template. Relatively low regularity measure values indicate relatively high levels of achievable regularity.

More specifically, in accordance with the method 500 of FIG. 6, several values are first initialized in step 505. In particular, the total number of signal classes represented in the candidate scheduling template to be evaluated is assigned to a value K; array $L_k$, (k=1 to K), is the number of slot assignments in the template for the respective classes K; and two-dimensional array $C_{k,l}$, (k=1 to K), (l=1 to $L_{k}-1$), represents weighting coefficients for signal class k and order l as described in greater detail below. Also, in step 505, summation value SUM and class value k are initialized to 0 and 1, respectively.

In steps 510 and 510, occurrence value l, order value n, and occurrence and positional values X and Y are then initialized as follows: l=1, n=1, X=l+n and Y=0. Then, in step 520, if the offset value X is less than or equal to the total slot assignments $L_k$ for signal class k, then the method proceeds to step 530, otherwise step 525 is performed before the method 500 proceeds to step 530. Step 520 detects when a "wrap-around" positional distance is to be calculated and the step 525 adjusts occurrence offset value X and slot position offset value Y, accordingly. In step 530, the positional distance P is determined between the l-th and x-th occurrence of slot assignments to signal class k.

Thus, when values l and n are both one and the value $L_k$ is two or greater, positional distance P is set to the distance between the first and second occurrence of signal class k. Accordingly, positional distance P between the first and second occurrence of signal class A of the template 320 in FIG. 4C is 2 (3-1). In step 530, of FIG. 6, the positional distance offset value Y in the positional distance P determination remains zero unless a "wrap-around" determination is made. In such instance, the offset Y is set to a value representing the total number of slot positions. After a positional distance value P is determined in step 530, a strictly convex function of such distance value is computed. A function F(x) is strictly convex if $F(\alpha x_1+(1-\alpha)x_2)<\alpha F(x_1)+(1-\alpha)F(x_2)$, where $0<\alpha<1$. A graphical depiction of such a function has a convex shape. The particular convex function employed is not critical to practicing the invention Exemplary convex finctions include $P^z$, where Z>1; $Z^P$, where Z>1; and $$\frac{1}{L-P},$$

where L is the number of template slot positions.

The produced value $P^z$ is then scaled by the corresponding weighting factor and added to the summation value SUM in step 535. The occurrence value l is then incremented in step 540. Then, in step 545, if the incremented occurrence value l is less than or equal to the total number of occurrences $L_k$ in the template for class k, the method 500 returns to step 515 to perform the next positional distance determination for the particular order n and signal class k, otherwise, the method 500 proceeds to step 550. More specifically, the method 500 proceeds to step 550 when the total number of positional distances of order n have been summed for the signal class k and included in the summation SUM including the corresponding "wrap-around" determinations. In step 550, the order value n is incremented.

Then, in step 555, if the incremented order value n is less than or equal to the total number of occurrences $L_k$ less one in the template for class k, i.e., the highest order for the particular class k, the method 500 returns to step 515 to perform the next positional distance determination for the incremented order n for the signal class k, otherwise, the method 500 proceeds to step 560. In step 560, the signal class value k is incremented and, in step 565, if the incremented value k is greater than the total number of signal classes K represented in the candidate template, then the method 500 proceeds to step 570, otherwise, it returns to step 510 to include positional distances for slot assignments of the next signal class into the summation SUM. In step 570, the resulting summation SUM includes the weighted summations of the ordered positional distances between slot assignments of the respective signal classes and is provided as the regularity measure. Thus, the method 500 first determines the positional distances of a particular order n for a signal class k, and then performs the next and subsequent order determinations and then performs such determinations for the next signal class. The particular sequence of steps of the method 500 have been shown for illustration purposes only and are not meant to be a limitation of the invention. It is possible to perform such steps in a different order or in a parallel manner in accordance with the invention. Moreover, different steps are useable for achieving the desired weighted summations.

The method 500 determines the regularity measure based on the weighted summations of all signal classes represented in the candidate scheduling template and all possible orders of positional distances for illustration purposes only. However, it is possible to determine a regularity measure in accordance with the invention based on at least one signal class represented in the scheduling template. Moreover, it is possible to determine a regularity measure summation using a first order summation or the distances between occurrences of slot positions assigned to the signal class as well as at least one higher order positional distance summation where distances are measured between n-th occurrences of slot positions assigned to that signal class. Such a measure is still sufficiently indicative of the regularity of a candidate template for use in identifying templates for a node in a communication network.

It is possible to determine advantageous scheduling templates as needed, on-demand, or alternatively, it is possible to generate a plurality different ratios of required slots for signal classes that are then stored in a table. Accordingly, when a template is employed for a particular ratio of required slots for signal classes, a corresponding template can rapidly be identified from such a table.

Although several embodiments of the invention have been described in detail above, many modifications can be made without departing from the teaching thereof. All of such modifications are intended to be encompassed within the following claims. For instance, it is possible to employ the technique of identifying scheduling templates in accordance with the invention for scheduling other events, such as the transmission order of respective communication signals in a TDMA wireless communication network, or the processing order of operations/transactions in a multiple-processor system.

The invention claimed is:

1. A method for identifying a scheduling template for a network, said template having a plurality of slots assigned to corresponding signal classes, wherein an ordering of said slots indicates a repetitive scheduling order for events on said network, said method comprising:

selecting a plurality of scheduling templates based on a selection criterion;

determining a regularity measure for at least one of said templates, said regularity measure based on a summation of values determined from positional distances between slots assigned to the same signal class for at least one of said signal classes; and selecting one of said scheduling templates for use in the communication network based on said determined regularity measures.

2. The method of claim 1 wherein said values of said summation of values are based on a convex function of said positional distances.

3. The method of claim 2 wherein said convex function is $P^Z$, wherein P represents a respective positional distance and Z is greater than 1.

4. The method of claim 2 wherein said convex function is $Z^P$, wherein P represents a respective positional distance and Z is greater than 1.

5. The method of claim 2 wherein said convex function is $$\frac{1}{L-P},$$

wherein P represents a respective positional distance and L represents the number of slots in the template.

6. The method of claim 1 wherein a regularity measure is determined for each of said templates and wherein the template with the lowest regularity measure is selected for use in the network.

7. The method of claim 1 wherein said summation includes a first summation based on positional distances between each slot assigned to a signal class and a corresponding next occurrence of a slot assignment in the sequence of template slots for that signal class, and a second summation based on positional distances between each slot assigned to said signal class and a corresponding N-th occurrence of a slot assignment in the sequence of template slots for that signal class, wherein N between 2 and M−1, wherein M is a value representing the number of occurrences of slots assigned to said signal class.

8. The method of claim 7 wherein said second summation is performed based on each value N between 2 and M−1.

9. The method of claim 7 wherein said first and second summation are performed for a plurality of said signal classes and wherein said respective produced summations are scaled based on the relative priority of desired regularity of the corresponding signal class.

10. The method of claim 9 wherein said relative priority is based on a corresponding delay sensitivity of communication signals for the respective signal classes.

11. The method of claim 7 wherein said first and second summation are performed for each signal class represented in the template and wherein said second summation is also performed for each N between 2 and M−1 for each signal class.

12. The method of claim 1 wherein a scheduling template is determined intermittently during operation of said network.

13. The method of claim 1 wherein said network is a time division multiple access network and wherein a scheduling template is determined for communication between a base station and wireless terminals.

14. The method of claim 1 wherein said events correspond to transmission of data packets and said signal classes correspond to at least one virtual circuit in said network.

15. The method of claim 14 wherein a scheduling template is identified for use in the network when a virtual circuit is established or terminated.

16. The method of claim 14 further comprising the steps of:

storing a plurality of determined scheduling templates in a table; and identifying a particular template as needed from transmitting said data packets of said virtual circuits.

17. The method of claim 1 wherein said events are processing of operations of types represented by said signal classes.

18. The method of claim 17 wherein said processing of operations is the processing of respective transactions.

19. A node for use in a communications network for conveying communication signals over established virtual circuits through said node comprising:

an input-output circuit module coupled to a plurality of ports for processing communication signals as incoming and outgoing signals, said module circuit for receiving incoming communication signals from at least one input port and for transmitting outgoing communication signals through at least one output port;

a buffer memory for temporarily storing communication signals to be conveyed through said output port; and a controller configured for controlling said module to transmit said communication signals for respective virtual circuits based on a scheduling template, said template having a plurality of slots assigned to corresponding virtual circuits, wherein an ordering of said slots indicates a repetitive scheduling order for transmission of communication signals associated with said respective virtual circuits, said controller identifying a desirable scheduling template slot order by selecting a plurality of scheduling templates based on a selection criterion, determining a regularity measure for at least one of said templates, said regularity measure based on a summation of values representing convex functions of positional distances between slots assigned to the same virtual circuit for at least one of said virtual circuits, and selecting one of said scheduling templates for use in the communication network based on said determined regularity measures.

20. The node of claim 19 wherein said communication signals represent asynchronous transfer mode data packets.

21. The node of claim 19 wherein said controller determines a regularity measure for each of said templates and wherein the template with the lowest regularity measure is selected for use in the node.

22. The node of claim 19 wherein said summation determined by said controller includes a first summation based on positional distances between each slot assigned to a virtual circuit and a corresponding next occurrence of a slot assignment in the sequence of template slots for that virtual circuit, and a second summation based on positional distances between each slot assigned to said virtual circuit and a corresponding N-th occurrence of a slot assignment in the sequence of template slots for that virtual circuit, wherein N between 2 and M−1, wherein M is a value representing the number of occurrences of slots assigned to said virtual circuit.

23. The node of claim 22 wherein said second summation is performed by said controller based on each value N between 2 and M−1.

24. The node of claim 22 wherein said first and second summation are performed by said controller for a plurality of said virtual circuits and wherein said respective produced summations are scaled based on the relative priority of desired regularity of the corresponding virtual circuit.

25. The node of claim 24 wherein said relative priority is based on a corresponding delay sensitivity of communication signals for the respective virtual circuits.

26. The node of claim 22 wherein said first and second summation are performed for each virtual circuit represented in the template and wherein said second summation is also performed for each N between 2 and M−1 for each virtual circuit.

* * * * *